United States Patent
Hollenbeck

(10) Patent No.: US 9,853,590 B1
(45) Date of Patent: Dec. 26, 2017

(54) SYSTEM AND METHOD FOR IMPROVING THE OPERATION OF ELECTRONICALLY CONTROLLED MOTORS

(71) Applicant: Nidec Motor Corporation, St. Louis, MO (US)

(72) Inventor: Robert K. Hollenbeck, Fort Wayne, IN (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/187,187

(22) Filed: Jun. 20, 2016

(51) Int. Cl.
*H02P 27/08* (2006.01)

(52) U.S. Cl.
CPC .................. *H02P 27/085* (2013.01)

(58) Field of Classification Search
CPC .................................................. H02P 27/085
USPC .......................................................... 318/503
See application file for complete search history.

(56) References Cited

U.S. PATENT DOCUMENTS

| | | | |
|---|---|---|---|
| 2007/0098374 A1* | 5/2007 | Fujiwara | G06F 1/203 388/811 |
| 2007/0216345 A1* | 9/2007 | Kanamori | H02P 6/181 318/814 |
| 2008/0298785 A1 | 12/2008 | Patel et al. | |
| 2009/0218971 A1* | 9/2009 | Jeung | H02P 6/085 318/400.17 |
| 2010/0052583 A1* | 3/2010 | Takamatsu | B60L 11/18 318/400.09 |
| 2011/0156625 A1 | 6/2011 | Kurosawa et al. | |
| 2011/0172859 A1 | 7/2011 | Sankaran et al. | |
| 2012/0001575 A1* | 1/2012 | Kubo | B60H 1/3213 318/400.17 |
| 2014/0084829 A1* | 3/2014 | Sung | H02P 27/085 318/400.23 |
| 2015/0054440 A1 | 2/2015 | Dernebo | |

* cited by examiner

*Primary Examiner* — Shawki S Ismail
*Assistant Examiner* — Muhammad S Islam
(74) *Attorney, Agent, or Firm* — Maginot Moore & Beck LLP

(57) ABSTRACT

An electrical motor controller changes the PWM frequency that is used by a motor driver to form the fundamental frequency and voltage magnitude for the electrical power delivered to an electrical motor. The electrical motor controller compares a signal generated by a first sensor that indicates an output speed of the motor to a predetermined speed threshold and compares a signal generated by a second sensor that corresponds to phase currents in the electrical motor to a predetermined motor power threshold. These comparisons are used to set the PWM frequency for the motor driver. The PWM frequency either corresponds to a frequency in a humanly imperceptible audio range or to a frequency that is in a humanly perceptible audio range.

16 Claims, 1 Drawing Sheet

SYSTEM AND METHOD FOR IMPROVING THE OPERATION OF ELECTRONICALLY CONTROLLED MOTORS

TECHNICAL FIELD

This disclosure relates generally to electrical motors, and more particularly, to electronic controls for operating such motors.

BACKGROUND

Electrical motors are used in a variety of applications. These applications include refrigeration units, pumping systems, and the like. Typically, the input power to a power supply for operating an electrical motor or other electrical equipment can vary depending upon the environment in which the power supply will be used. Electronic controls are used to operate the electrical motors in a manner that attempts to optimize the efficiency of the motor, vary the output speed to reduce load power, and maximize the power output of the motor. In some applications, reducing the noise audible to humans is added to these goals.

In previously known electrical motor controls, quiet operation of multiple speed and variable speed motors is obtained by operating the motors at frequencies above the audible range to attenuate the noise produced by the motors to an acceptable level. For example, these higher frequencies that operate the motor are typically in a range of about 15.5 KHz to 20 KHz. These higher frequencies, however, produce higher losses in the motor and generate heat that must be removed. The inclusion of components to remove heat adds cost to the circuit. Being able to provide an electrical motor control circuit that improves motor efficiency and helps control noise without adding cost to the circuit would be useful.

SUMMARY

An electronic motor control circuit effectively controls motor noise at a lower cost and improves system efficiency. The motor control circuit includes a motor driver operatively connected to a power supply and operatively connected to an electrical motor, a sensor configured to generate a signal indicative of a speed of the electrical motor, and a controller operatively connected to the motor driver and the sensor. The controller is configured to receive the signal generated by the sensor, compare the received signal to a predetermined speed threshold, and set a PWM frequency to a frequency in a first range of frequencies for the motor driver in response to the received signal being less than the predetermined speed threshold.

A method of controlling electrical motors enables effective motor noise control at lower cost and improves the efficiency of the motor. The method includes providing electrical power to an electrical motor through a motor driver with reference to frequency parameters received from a controller, generating with a first sensor a signal indicative of a speed of the electrical motor, receiving with the controller the signal generated by the first sensor, comparing with the controller the signal received from the first sensor to a predetermined speed threshold, and setting a PWM frequency to a frequency in a first range of frequencies for the motor driver in response to the signal received from the first sensor being less than the predetermined speed threshold.

DETAILED DESCRIPTION

Figure 1:
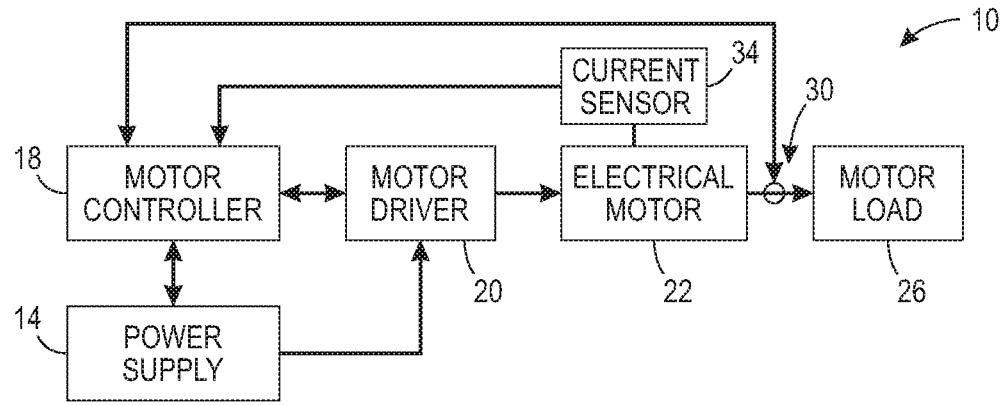
FIG. 1 is a block diagram of an electrical motor control circuit that enables effective motor noise control at a lower cost and that improves the efficiency of the motor.

FIG. 1 shows a block diagram of a typical application in which an electronic motor controller is used to operate an electrical motor. The circuit 10 includes a power supply 14, a motor controller 18, a motor driver 20, an electrical motor 22, and a load 26 that is driven by the motor 22. A typical load is a pump or fan that moves fluids or air in response to rotational output of the motor output shaft that couples the load to the motor. The power supply 14 is a circuit that receives input power and provides a high voltage DC buss for the motor driver and low voltage power for the motor controller 18 and the motor driver 20. For example, in some applications, the motor driver 20 is an H-bridge circuit that provides pulse width modulated (PWM) power to the electrical power inputs of the motor 22. Such motor drivers are well-known within the art.

The motor controller 18 is a processor that is configured with programmed instructions to set PWM frequencies and other control parameters for the motor driver 20 and to receive measurements regarding the operation of the motor. To provide the control disclosed in this document, a sensor 30, such as a rotary encoder, is provided on the output shaft of the motor and the controller 18 is operatively connected to the sensor 30. The sensor 30 generates a signal indicative of the speed at which the motor is being operated. Such a signal can indicate, for example, a number of rotations of an output shaft per unit of time, such as revolutions per minute (RPM). The motor controller 18 can also use motor phase currents to determine or approximate the motor speed. The sensor 34 is a known current sensor that generates signals corresponding to the phase currents in the electrical motor 22. The controller 18 uses the output speed signal from the sensor 30 or the phase current signals from the sensor 34, depending on the motor output current or the motor speed, to vary the PWM frequency sent to the motor driver 20. Specifically, the controller 18 sets the PWM frequency in the 15.5 KHz to 20 KHz range in response to the motor speed being less than a predetermined speed threshold and sets the PWM frequency in a lower frequency range in response to the motor speed being greater than the predetermined speed threshold and the phase currents being greater than the predetermined motor power threshold. The lower PWM frequency range can be, for example, 5 to 10 kHz. The predetermined speed threshold is selected to be a speed indicative of the motor operating the load at a low speed. At low speed, the motor and the load generate little noise as long as the motor is provided high frequency PWM electrical power by the motor driver 20. At speeds above the predetermined speed threshold, the load begins making noise so the motor noise does not require as much attenuation. Therefore, the controller 18 provides lower PWM frequency to the motor driver 20, and though the motor noise begins to achieve a frequency in the audible human range, it is drowned out by the load noise. At the lower frequencies, the motor driver 20 is more efficient and generates less heat. Thus, system efficiency in the application is improved without adding components to the circuit 10.

Figure 2:
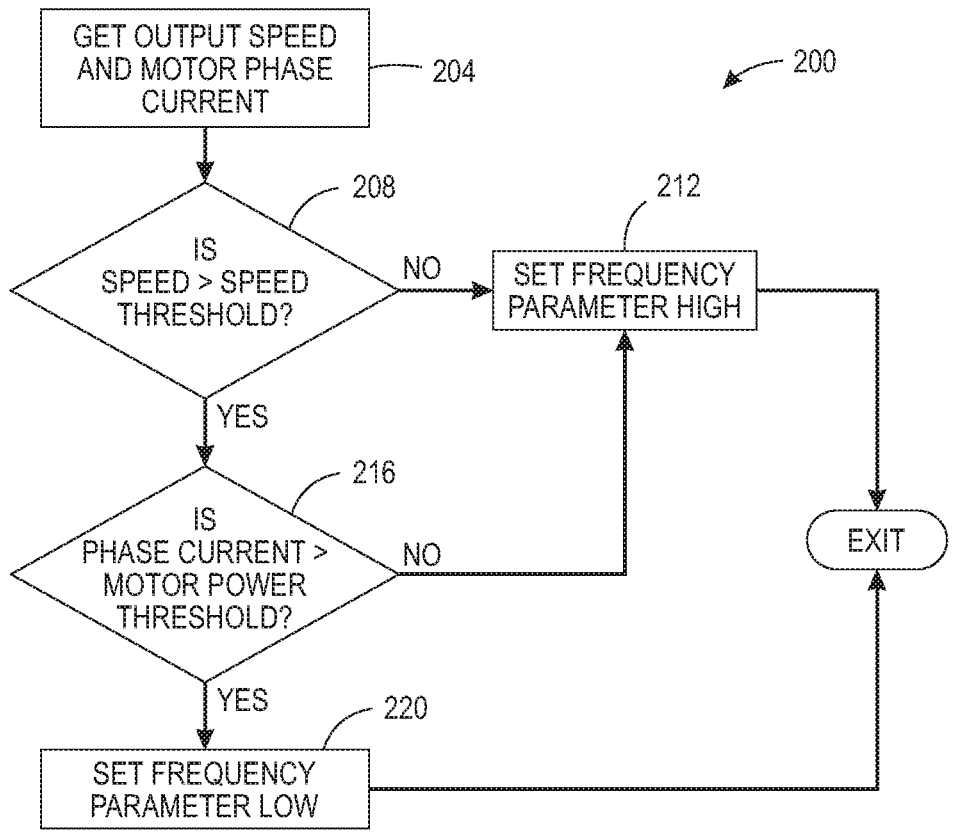
FIG. 2 is a flow diagram of a method for enabling effective motor noise control at a lower cost with improved motor efficiency.

A method of controlling electrical motor operation that improves motor efficiency and attenuates noise produced by the motor is shown in FIG. 2. The process 200 is an improvement to the controlling of the PWM frequency based on motor output speed. In the description of the method, statements that the method is performing some task or function refers to a controller or general purpose processor executing programmed instructions stored in non-transitory computer readable storage media operatively connected to the controller or processor to manipulate data or to operate one or more components to perform the task or function. The controller 18 noted above can be such a controller or processor. Alternatively, the controller can be implemented with more than one processor and associated circuitry and components, each of which is configured to form one or more tasks or functions described herein.

The process 200 is performed at predetermined time intervals such as once per second. The process begins with the controller receiving the signal corresponding to the output speed of the motor from the sensor 30 and the phase currents in the electrical motor 22 from the sensor 34 (block 204). The output speed of the motor is compared to a predetermined speed threshold (block 208). If the motor speed is less than the predetermined speed threshold, the controller sends an output PWM frequency to the motor driver 20 so the driver generates output power in the higher PWM frequency range to keep the motor noise at a near inaudible level (block 212). The controller generated PWM frequency is modulated by the driver 20 to obtain the lower frequency and magnitude to provide power that drives the motor. If the motor speed is greater than the predetermined speed threshold, the controller analyzes the phase currents with reference to a predetermined motor power threshold (block 216). If the analysis of the phase currents indicates the motor power is less than the predetermined motor power threshold, then the controller sets the PWM output frequency for the motor driver 20 to a value that enables the driver to generate fundamental motor output power using a higher PWM frequency range to keep the motor noise at a near inaudible level (block 212). Otherwise, the controller sets PWM output frequency for the motor driver 20 so the driver generates fundamental motor output power using the lower PWM frequency range that keeps the motor noise less than the noise produced by the electrical load (block 220). The controller 18 then executes other programmed instructions until the predetermined time interval expires and the process 200 is repeated.

The control circuit 10 implementing the process 200 is advantageous in a number of environments. For example, when the motor load is a pump that moves a fluid, such as water, through a swimming pool or other reservoir. Before the pump is primed, the pump is moving air rather than water. The motor is operated at a high speed to prime the pump, which requires low motor power so the process described above sets the PWM frequency to the high frequency range. This operation enables the electrical motor and pump to generate less noise during the priming operation. As the pump is primed, the output electrical power load of the motor increases significantly because the pump is now moving water rather than air so the power delivered to the motor must increase to maintain the speed of the motor. At this point, motor speed and power require the low PWM frequency range so the motor operates more efficiently and its noise is masked by the noise of the primed pump driving water through the pump. Thereafter, if an event occurs that drops the electrical motor output power, such as a clogged filter or other pipe restriction, or the motor is controlled to be operated at a speed lower than a speed supported by the low PWM frequency range, a high PWM frequency is set for the motor driver to reduce the PWM noise of the motor, which provides an indication of the occlusion in the flow system or a low motor operating speed. While priming of an air flow system is different, the control circuit implementing the process described above similarly sets the PWM frequency for the motor driver to a low frequency once a fan has reached operational air flow through a system. When a conduit occlusion impedes air flow, such as a clogged filter or blocked air flow, a high PWM frequency is set for the motor driver so the fan and the electrical motor operate in a quieter mode while the fan operates in a lower power mode so the fan generates less noise as an indication of that condition.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An electrical motor control circuit comprising:
a motor driver operatively connected to a power supply and operatively connected to an electrical motor;
a first sensor configured to generate a signal indicative of a speed of the electrical motor;
a second sensor configured to generate a signal indicative of at least one phase current in the electrical motor; and
a controller operatively connected to the motor driver, the second sensor, and the first sensor, the controller being configured to:
receive the signal generated by the first sensor;
receive the signal generated by the second sensor;
compare the received signal to a predetermined speed threshold;
compare the signal generated by the second sensor to a predetermined motor power threshold;
set a pulse width modulated (PWM) frequency to a frequency in a first range of frequencies for the motor driver in response to the received signal being less than the predetermined speed threshold; and
set the PWM frequency to a frequency in a second range of frequencies for the motor driver in response to the signal received from the first sensor being greater than the predetermined speed threshold and the signal received from the second sensor being greater than the predetermined motor power threshold, all of the frequencies in the first range of frequencies being greater than each frequency in the second range of frequencies.

2. The control circuit of claim 1 wherein the first sensor is a rotary encoder configured to generate a signal indicative of a number of rotations of an output shaft of the electrical motor per unit of time.

3. The control circuit of claim 1 wherein the motor driver is an H-bridge circuit.

4. The control circuit of claim 1 wherein the first predetermined threshold is a number of rotations of the output shaft of the electrical motor per unit of time that corresponds to a light load on the electrical motor.

5. The control circuit of claim 1 wherein the first range of frequencies is in a range of about 15.5 KHz to about 20 KHz.

6. The control circuit of claim 1 wherein the second range of frequencies is in a range of about 5 KHz to about 10 KHz.

7. The control circuit of claim 1 further comprising:
a pump operatively connected to an output of the electrical motor.

8. The control circuit of claim 1 further comprising:
a fan operatively connected to an output of the electrical motor.

9. A method of controlling an electrical motor comprising:
providing electrical power to an electrical motor through a motor driver with reference to frequency parameters received from a controller;
generating with a first sensor a signal indicative of a speed of the electrical motor;
receiving with the controller the signal generated by the first sensor;
comparing with the controller the signal received from the first sensor to a predetermined speed threshold;
setting a pulse width modulated (PWM) frequency to a frequency in a first range of frequencies for the motor driver in response to the signal received from the first sensor being less than the predetermined speed threshold;
generating with a second sensor a signal indicative of at least one phase current in the electrical motor;
receiving with the controller the signal generated by the second sensor;
comparing with the controller the signal generated by the second sensor to a predetermined motor power threshold;
setting the PWM frequency to a frequency in the first range of frequencies for the motor driver in response to the signal received from the first sensor being greater than the predetermined speed threshold and the signal from the second sensor being less than the predetermined motor power threshold; and
setting the PWM frequency to a frequency in a second range of frequencies for the motor driver in response to the signal received from the first sensor being greater than the predetermined speed threshold and the signal received from the second sensor being greater than the predetermined motor power threshold, all of the frequencies in the first range of frequencies being greater than each frequency in the second range of frequencies.

10. The method of claim 9, the generation of the signal indicative of the speed of the electrical motor further comprising:
generating with a rotary encoder a signal indicative of a number of rotations of an output shaft of the electrical motor per unit of time.

11. The method of claim 9 wherein the provision of electrical power to the electrical motor is provided through an H-bridge circuit.

12. The method of claim 9 wherein the first predetermined speed threshold is a number of rotations of the output shaft of the electrical motor per unit of time that corresponds to a light load on the electrical motor.

13. The method of claim 9 wherein the first range of frequencies is in a range of about 15.5 KHz to about 20 KHz.

14. The method of claim 9 wherein the second range of frequencies is in a range of about 5 KHz to about 10 KHz.

15. The method of claim 9 further comprising:
operating a pump with an output of the electrical motor.

16. The method of claim 9 further comprising:
operating a fan with an output of the electrical motor.

\* \* \* \* \*